United States Patent
Choi et al.

(10) Patent No.: US 9,900,176 B2
(45) Date of Patent: Feb. 20, 2018

(54) COMMUNICATION METHOD AND APPARATUS USING SMART MODULE IN HOME NETWORK SYSTEM

(71) Applicant: Samsung Electronics Co., Ltd., Suwon-si, Gyeonggi-do (KR)

(72) Inventors: Young-Jun Choi, Seoul (KR); Seong-Man Park, Seoul (KR); Joong-Ki Moon, Seoul (KR); Dong-Yun Hawng, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 14/906,156

(22) PCT Filed: Jul. 16, 2014

(86) PCT No.: PCT/KR2014/006431
§ 371 (c)(1),
(2) Date: Jan. 19, 2016

(87) PCT Pub. No.: WO2015/009051
PCT Pub. Date: Jan. 22, 2015

(65) Prior Publication Data
US 2016/0164693 A1   Jun. 9, 2016

(30) Foreign Application Priority Data

Jul. 17, 2013  (KR) .................. 10-2013-0084188

(51) Int. Cl.
*H04L 12/28*  (2006.01)

(52) U.S. Cl.
CPC ........ *H04L 12/281* (2013.01); *H04L 12/2809* (2013.01); *H04L 12/2827* (2013.01)

(58) Field of Classification Search
None
See application file for complete search history.

(56) References Cited

U.S. PATENT DOCUMENTS

| 2008/0104212 A1* | 5/2008 | Ebrom | G04R 20/26 709/222 |
| 2008/0188963 A1* | 8/2008 | McCoy | G06F 9/54 700/90 |

(Continued)

FOREIGN PATENT DOCUMENTS

| JP | 2003-283503 A | 10/2003 |
| KR | 10-2005-0099741 A | 10/2005 |
| WO | 2005/117389 A1 | 12/2005 |

*Primary Examiner* — Diane Lo
(74) *Attorney, Agent, or Firm* — Jefferson IP Law, LLP

(57) ABSTRACT

Disclosed is a method of performing communication by a smart module in a home network system. The method includes: obtaining device level information of a device; identifying whether the device level information of the device indicates a device level which can provide only a mandatory function; when the device level information of the device indicates the performance which can provide only the mandatory function, transmitting a status request message making a request for status information of the device to the device; receiving a status response message including information indicating whether a status of the device has changed; and when the information indicates that the status of the device has changed, transmitting an event generation message to a host system.

28 Claims, 6 Drawing Sheets

(56) References Cited

U.S. PATENT DOCUMENTS

| | | |
|---|---|---|
| 2009/0271013 A1 | 10/2009 | Chen |
| 2010/0071053 A1 | 3/2010 | Ansari et al. |
| 2011/0137846 A1 | 6/2011 | Kim et al. |
| 2011/0282936 A1 | 11/2011 | Chekhanovskiy et al. |
| 2012/0233478 A1 | 9/2012 | Mucignat et al. |
| 2013/0033995 A1 | 2/2013 | Kraglund et al. |
| 2013/0245849 A1* | 9/2013 | Paul ................ H02J 3/14 |
| | | 700/295 |
| 2014/0039699 A1* | 2/2014 | Forbes, Jr. ........ G05B 19/02 |
| | | 700/286 |

* cited by examiner

[Fig. 1]
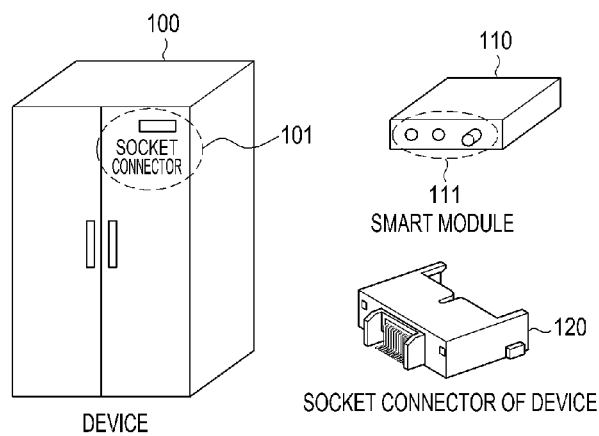
[Fig. 2]
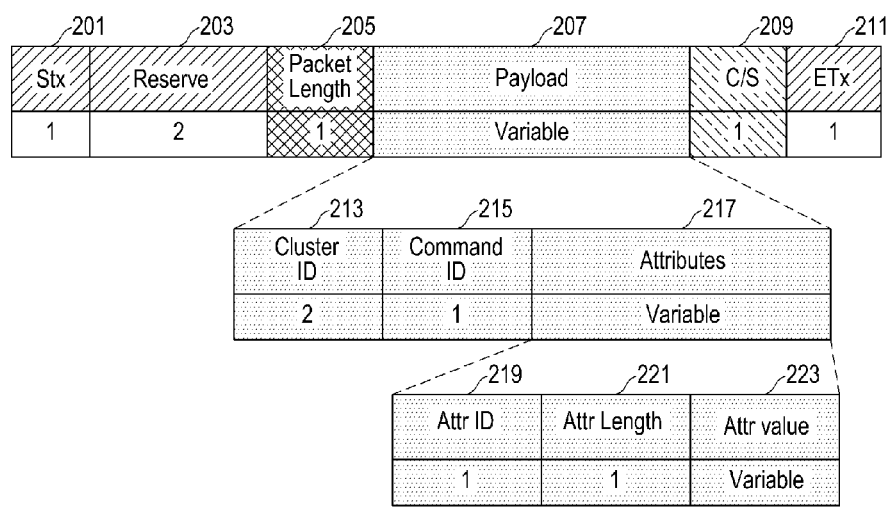

[Fig. 3]
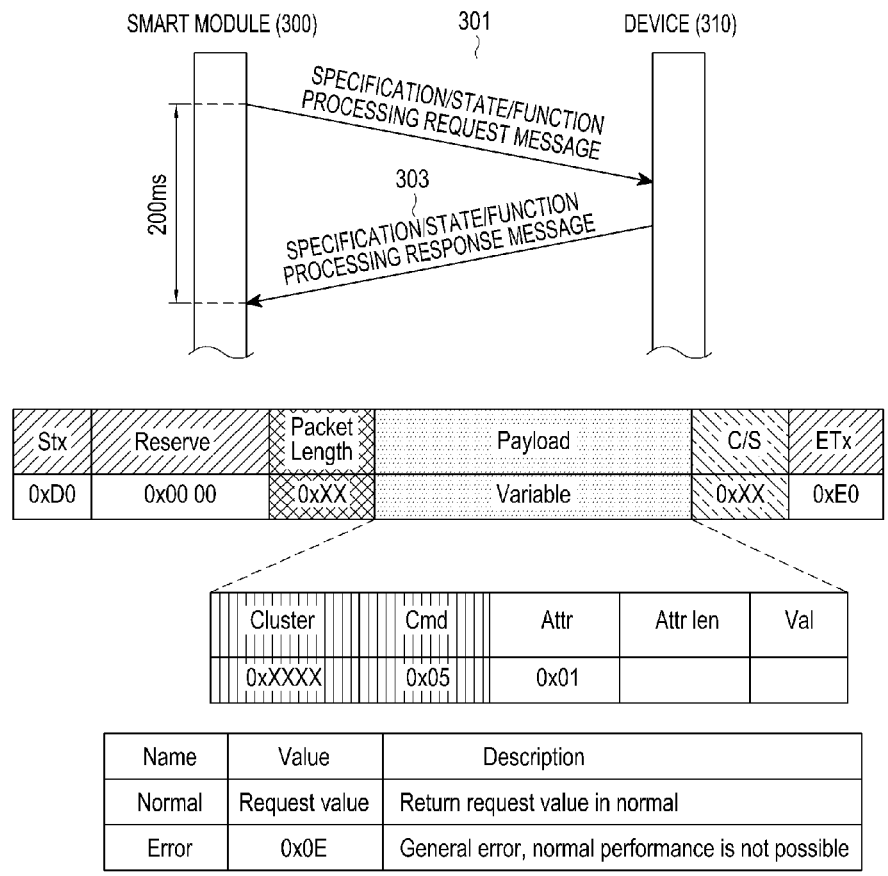
[Fig. 4]
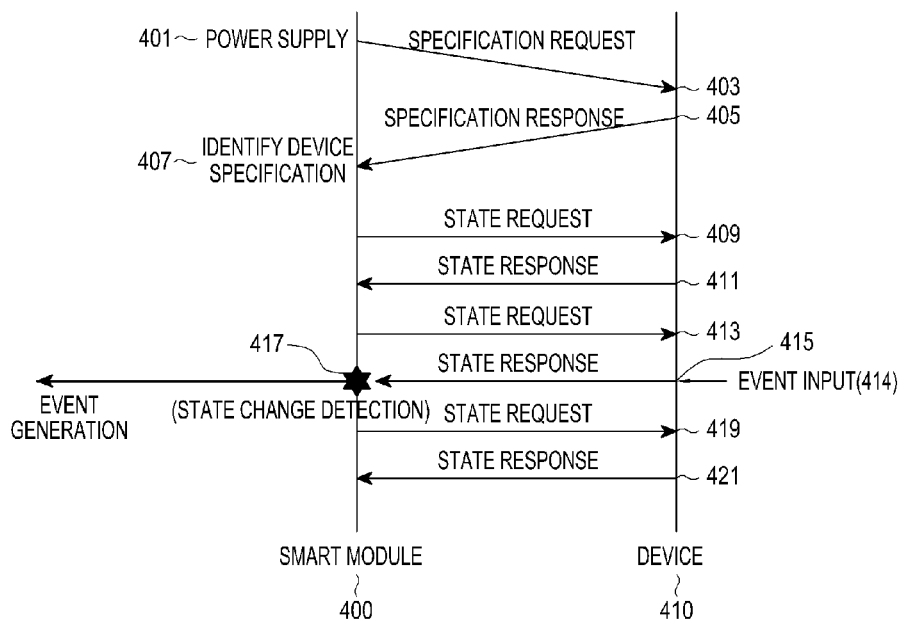

[Fig. 5]
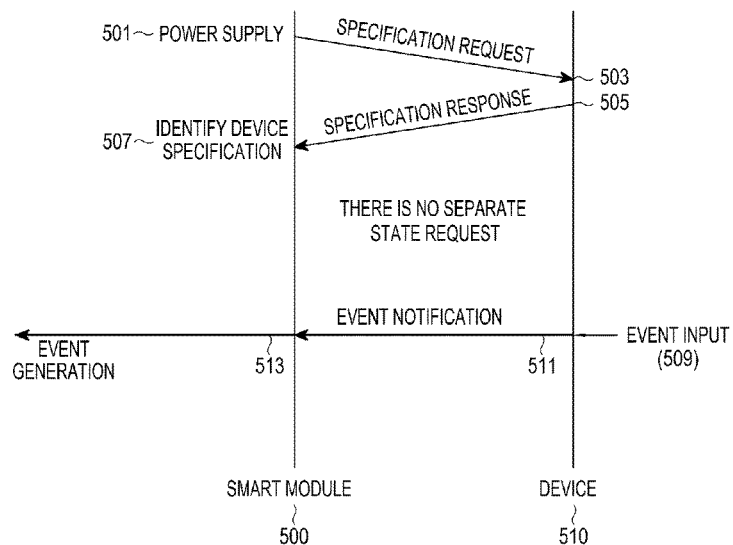
[Fig. 6]
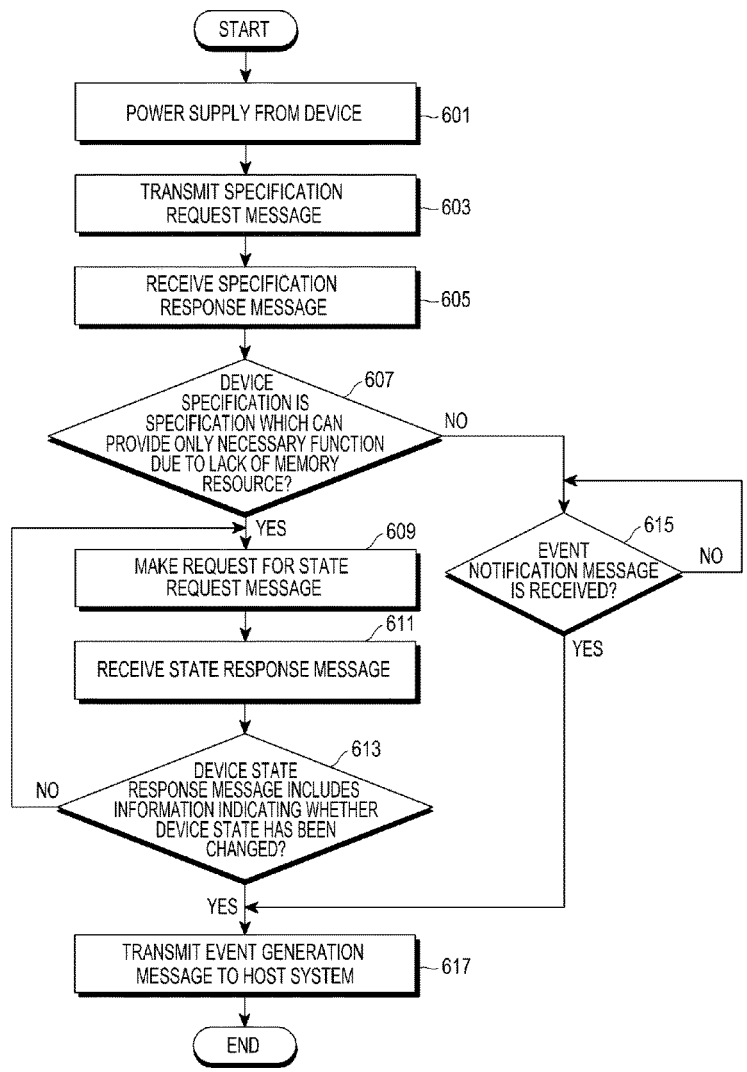

[Fig. 7]
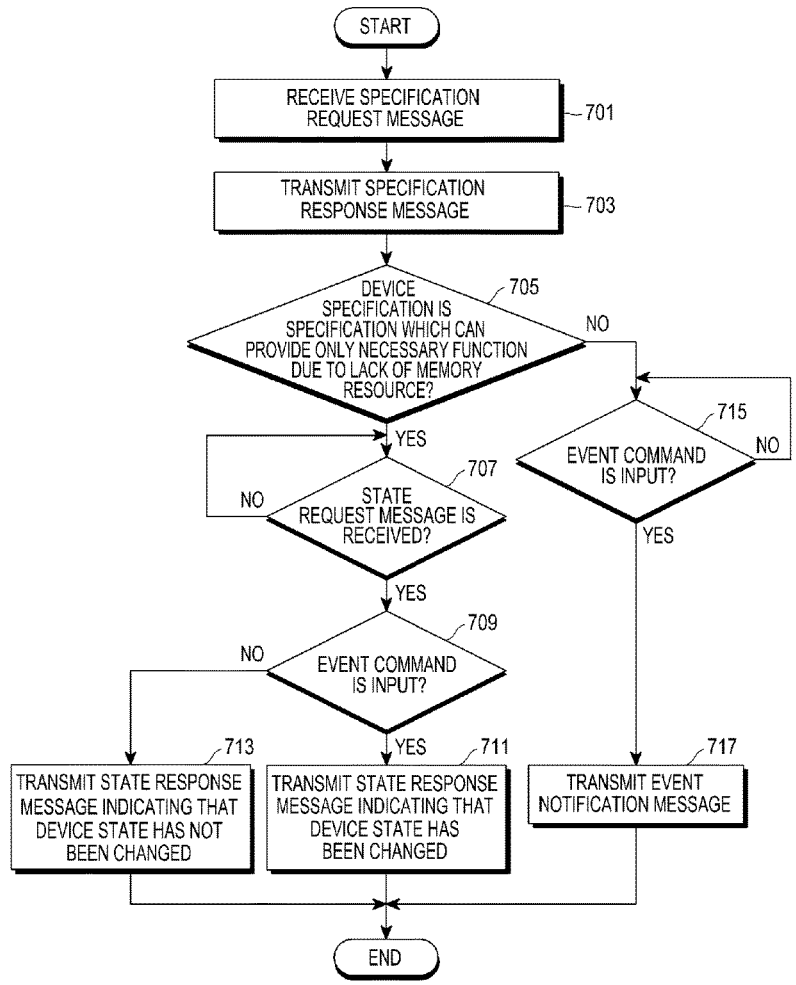
[Fig. 8]
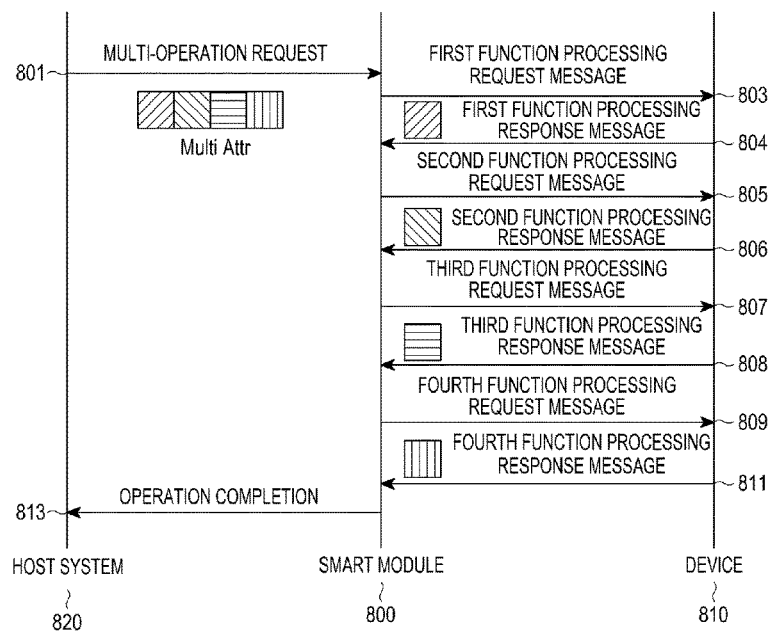

[Fig. 9]
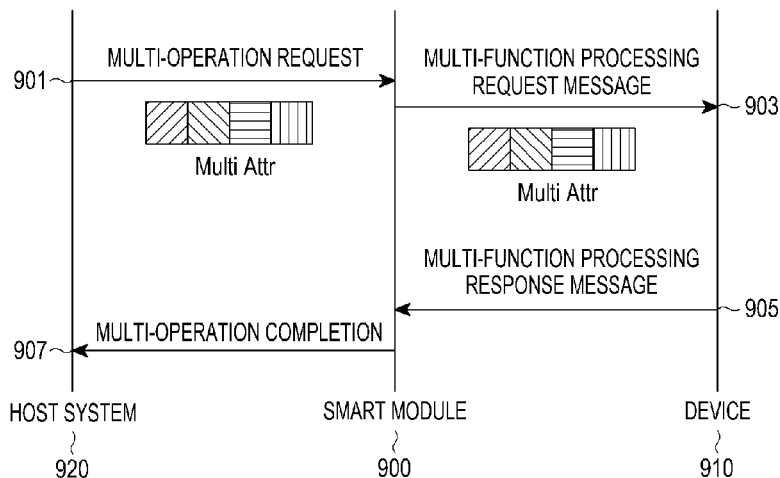
[Fig. 10]
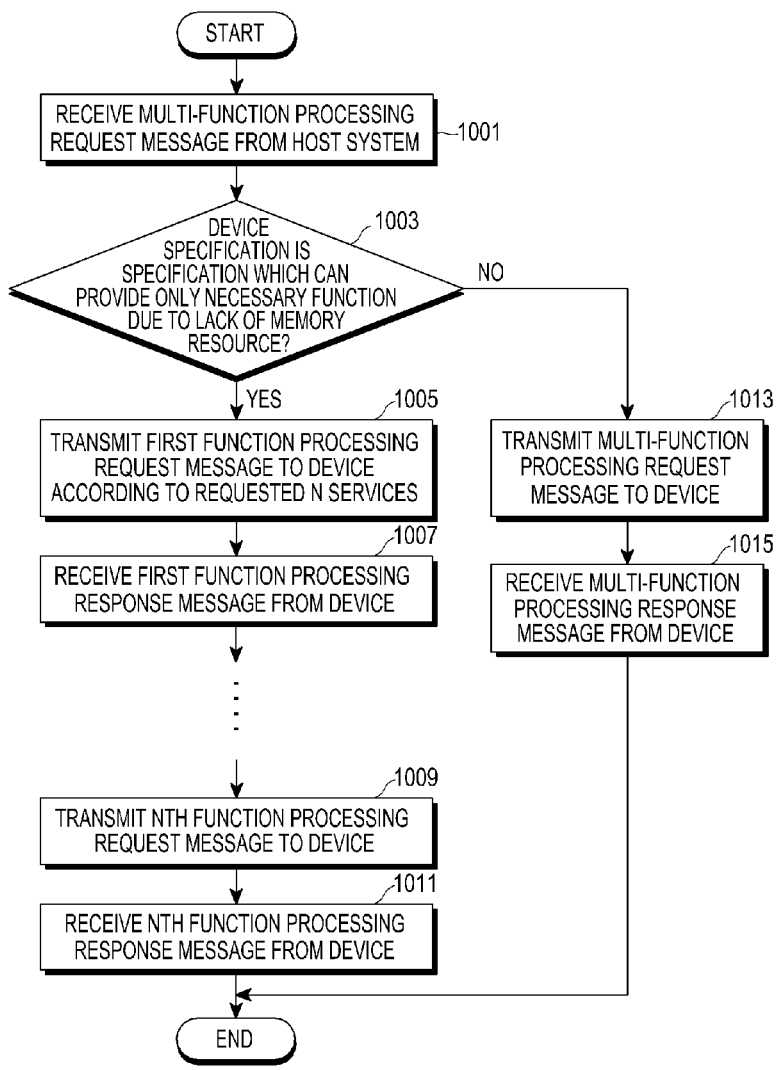

[Fig. 11]
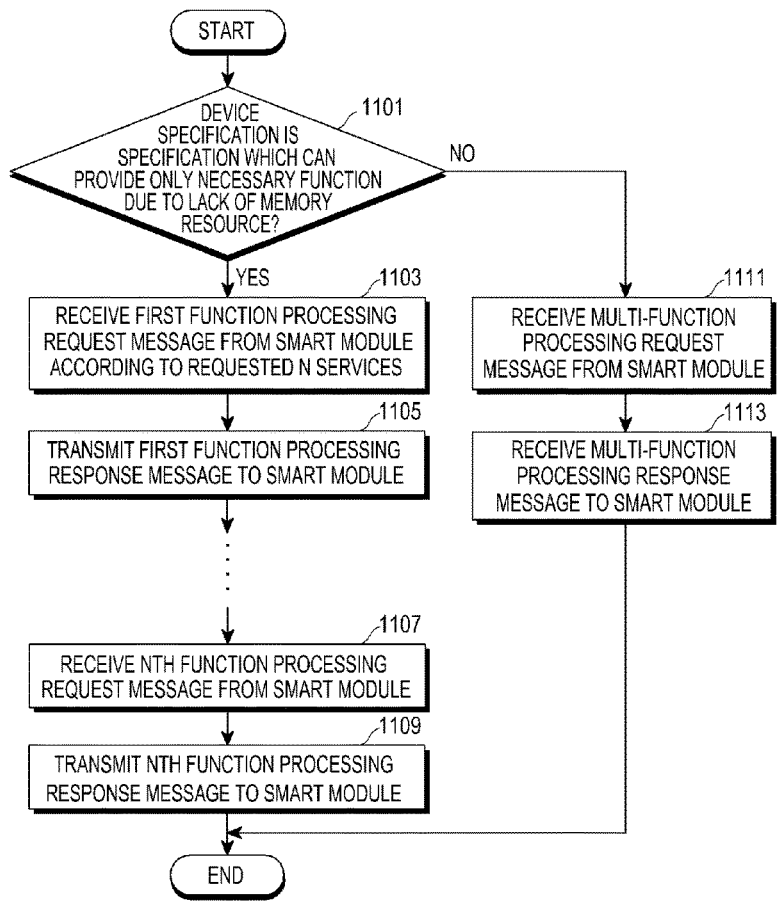
[Fig. 12]
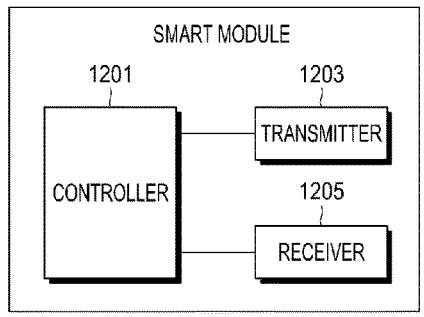
[Fig. 13]
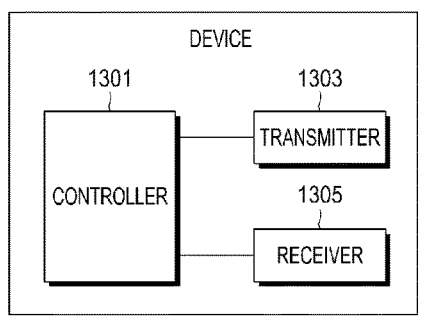

COMMUNICATION METHOD AND APPARATUS USING SMART MODULE IN HOME NETWORK SYSTEM

CROSS-REFERENCE TO RELATED APPLICATION(S)

This application is a U.S. National Stage application under 35 U.S.C. § 371 of an International application filed on Jul. 16, 2014 and assigned application number PCT/KR2014/006431, which claimed the benefit of a Korean patent application filed on Jul. 17, 2013 in the Korean Intellectual Property Office and assigned Serial number 10-2013-0084188, the entire disclosure of which is hereby incorporated by reference.

TECHNICAL FIELD

The present disclosure relates to a home network system, and more particularly to a smart module providing a smart home function and a protocol between devices connected to the smart module.

BACKGROUND ART

A home network system is a system that enables communication between home devices by connecting the home devices such as a refrigerator, an air conditioner, a television, a Personal Computer (PC), a VCR, a stereo system, a printer, a door lock, a washing machine and the like through a wired or wireless network. In order to connect the home devices to the network, various communication schemes such as a Power Line Communication (PLC), Ethernet, Bluetooth, Institute of Electrical and Electronics Engineers (IEEE) 1394 are used.

In the home network system, a smart home function controls the home devices according to a request from a user to provide the user with a remote control, monitoring, energy related information, and an automatic notification function for the home devices.

However, in general, among the home devices, only models of a particular device level for each home appliance are equipped with the smart home function, and accordingly, home devices of the remaining models except for the particular device level cannot support the smart home function.

Further, a protocol structure between a device and a module supporting the smart home function uses a fixed packet and uses a separate Acknowledgement (Ack) signal for identifying downlink. Accordingly, even when the user controls a simple function of the device, a response time delay due to the use of unnecessary fields is generated and also unnecessary memory waste and power loss are generated.

DISCLOSURE OF INVENTION

Technical Problem

Embodiments of the present disclosure provide a smart module supporting smooth interworking between all devices within a home network system and a host system and provide a protocol between the smart module and the devices.

Further, the present disclosure provides a protocol structure which can minimize memory capacities included in the device and execute a smart home function with smaller power consumption when a message is transmitted between the smart module and the device.

In addition, the present disclosure provides a method of processing a function of the device, making a request for a device level, and processing and controlling an event generated in the device when the smart module interworks with the device.

Solution to Problem

In accordance with an aspect of the present disclosure, a method of performing communication by a smart module in a home network system is provided. The method includes: obtaining device level information of a device; identifying whether the device level information of the device indicates a device level which can provide only a mandatory function; when the device level information of the device indicates the performance which can provide only the mandatory function, transmitting a status request message making a request for status information of the device to the device; receiving a status response message including information indicating whether a status of the device has changed; and when the information indicates that the status of the device has changed, transmitting an event generation message to a host system.

In accordance with another aspect of the present disclosure, a method of performing communication by a device in a home network system is provided. The method includes: when a device level request message is received from a smart module, transmitting a device level response message including device level information of the device; when the device level information of the device indicates a device level which can provide only a mandatory function, identifying whether an event is generated when a status request message is received; and when the event is generated, transmitting a status response message including information indicating that a status of the device has changed to the smart module.

In accordance with another aspect of the present disclosure, a smart module communicating in a home network system is provided. The smart module includes: a receiver that receives a device level response message including device level information of a device and receives a status response message including information indicating whether a status of the device has changed; a controller that identifies whether the device level information of the device indicates a device level which can provide only a mandatory function and identifies whether the status of the device has changed from the status response message; and a transmitter that transmits a status request message making a request for status information of the device to the device when the device level information of the device indicates the device level which can provide only the mandatory function, and transmits an event generation message informing of generation of an event to a host system when the status response message includes the information indicating that the status of the device has changed.

In accordance with another aspect of the present disclosure, a device for communication in a home network system is provided. The device includes: a receiver that receives a device level request message and a status request message from a smart module; a transmitter that transmits a device level response message including device level information of the device and transmits a status response message including information indicating that a status of the device has changed; and a controller that, when the device level information of the device indicates a device level which can provide only a mandatory function, identifies whether an event is generated when the status request message is received.

Advantageous Effects of Invention

The present disclosure allows devices which have no communication module or have a memory capacity insufficient for a smart home network service to use a home network service by using a smart module.

Further, in a protocol structure for communication between the device and the smart module, response speed and memory buffering can be improved and power consumption can be reduced using a variable packet structure.

BRIEF DESCRIPTION OF DRAWINGS

The above and other aspects, features, and advantages of the present disclosure will be more apparent from the following detailed description taken in conjunction with the accompanying drawings, in which:

FIG. 1 illustrates a device, a socket connector mounted to the device, and a smart module connected to the device through the socket connector according to an embodiment of the present disclosure;

FIG. 2 illustrates a protocol applied between a device and a smart module according to an embodiment of the present disclosure;

FIG. 3 illustrates a process of transmitting/receiving a message between a smart module and a device according to an embodiment of the present disclosure;

FIG. 4 illustrates a process of transmitting a device level request message and a state request message and transmitting a device level response message and a state response message in response to the request messages according to an event processing process between a device and a smart module according to a first embodiment of the present disclosure;

FIG. 5 illustrates a process in which a smart module transmits a device level request message and a state request message and receives a device level response message and a state response message as responses to the request messages according to an event processing process between a device and a smart module according to a second embodiment of the present disclosure;

FIG. 6 is a flowchart illustrating operations of a smart module according to a first embodiment and a second embodiment of the present disclosure;

FIG. 7 is a flowchart illustrating operations of a device according to the first embodiment and the second embodiment of the present disclosure;

FIG. 8 illustrates a process in which a smart module transmits a multi-operation request received from a host system to a device according to a third embodiment of the present disclosure;

FIG. 9 illustrates a process in which a smart module transmits a multi-operation request message received from a host system to a device according to a fourth embodiment of the present disclosure;

FIG. 10 is a flowchart illustrating operations of a smart module according to the third embodiment and the fourth embodiment of the present disclosure;

FIG. 11 is a flowchart illustrating operations of a device according to the third embodiment and the fourth embodiment of the present disclosure;

FIG. 12 is a block diagram illustrating a configuration of a smart module according to the present disclosure; and FIG. 13 is a block diagram illustrating a configuration of a device according to the present disclosure.

MODE FOR THE INVENTION

Hereinafter, embodiments of the present disclosure will be described with reference to the accompanying drawings. In the following description of the present disclosure, a detailed description of known configurations or functions incorporated herein will be omitted when it is determined that the detailed description may make the subject matter of the present disclosure unclear. Hereinafter, an exemplary embodiment of the present disclosure will be specifically described with reference to the accompanying drawings.

According to embodiments of the present disclosure described below, a message transmitted/received between a device and a smart module connected to the device and a structure of the message will be described.

To this end, the present disclosure defines a protocol for the message transmitted/received between the device and the smart module, and the protocol includes a field indicating a function of the device, a field indicating an attribute of the device, and a field indicating function processing of the devices.

Through the protocol, the smart module may transmit a device level request message requesting a device level of the device, a status request message requesting a status of the device, and a function processing request message requesting an operation of the device to the device.

In response to the messages, the device may transmit a device level response message presenting its own device level to the smart module, a status response message presenting its own current status, and a function processing response message presenting a result according to the performance of the operation or an error generated during the operation by using the protocol.

The description of each protocol and the description of the messages transmitted/received between the smart module and the device will be described in more detail through the accompanying drawings and Tables below.

FIG. 1 illustrates a device, a socket connector mounted to the device, and a smart module connected to the device through the socket connector.

Referring to FIG. 1, a device 100 includes a socket connector 120 to which a smart module 110 can be mounted, and the socket connector 120 is mounted to the device 100 as indicated by a reference numeral 101. The device 100 may correspond to all devices to which a smart home function can be applied in a home network system, for example, a refrigerator, a washing machine, an air conditioner, a fan, an oven, a lamp, domestic appliances, a boiler, a television and the like.

The socket connector 120 may be connected to the smart module 110 in a pin to pin scheme and may apply power between the smart module 110 and the device 100 and reset a function of the device 100.

The smart module 110 may connect a home network system (referred to as a "host system", "home server", or a "home system") and devices in a wired or wireless manner, and particularly, interwork with devices having no smart home function to connect the devices with the home network system.

Further, the smart module 110 may perform a function of automatically controlling inherent functions of the devices and accessing the Internet by sharing contents between the devices connected to the smart module 110.

When the smart module 110 is connected to a device having a function of preventing crime/disaster and controlling heating, cooling, and gas, the smart module 110 may detect a situation change and a device status change detected within the home network and control the device according to the detected changes.

The smart module 110 transmits, to the device 100, a device level request message making a request for a device level, a status request message making a request for a status of the device, and a function processing request message making a request for an operation according to a function of the device. In response to the messages, the smart module 110 receives, from the device 100, a device level response message presenting the device level, a status response message presenting the status of the device, and a function processing response message presenting a result according to cases where the device has completed the operation and the device has not completed the operation due to the generation of an error during the operation.

Referring to FIG. 1, although the smart module and the socket connector are separated from the device, the smart module may be included within the device and thus the smart module may not be located outside the device. Further, the smart module and the socket connector may be implemented as one device and connected to the device.

FIG. 2 illustrates a protocol applied between the device and the smart module according to an embodiment of the present disclosure.

Referring to FIG. 2, a protocol field includes an STx field 201, a reserve field 203, a packet length field 205, a payload field 207, a C/S field 209, and an ETx field 211.

Table 1 describes main fields included in the protocol field.

TABLE 1

| Field | Length (Byte) | Description |
| --- | --- | --- |
| STx/ETx | 1/1 | Indicates the start/end of a packet |
| Reserve | 2 | Indicates a temporary field for an expansion and compatibility of a future packet |
| Packet Length | 1 | Indicates a length from a payload field to an ETx field |
| Payload | Variable | Indicates information on request for device level, status, and function processing, response information thereof, and information on attributes provided by the device |
| C/S(check sum) | 1 | Indicates an XOR calculation value from an STx field to a last byte of payload (header + payload) |

The STx field 201 refers to a start byte and has a size of one byte. For example, the STx field 201 may be provided in the form of 0xD0 to indicate a start of a message transmitted/received between the smart module and the device.

The reserve field 203 refers to a temporary field for an expansion or compatibility of a function of the message transmitted/received between the smart module and the device and has a size of two bytes. For example, the expansion of the function of the message may refer to a sequence number or information indicating a version update of the protocol.

The packet length field 205 refers to a length from the payload field 207 to the ETx field 211 and has a size of one byte.

The C/S field 209 refers to an Exclusive OR (XOR) calculation from the STx field 201 to a last byte of the payload field in the message and has a size of one byte.

The ETx field 211 refers to the last byte of the message and has a size of one byte. For example, the ETx field 211 may have a value such as 0xE0 to inform of the last of a frame.

The payload field 207 has a variable size and may include a cluster IDentifier (ID) field 213, a command ID field 215, and an attribute field 217.

Table 2 describes main fields included in the payload field 207 according to an embodiment of the present disclosure.

TABLE 2

| Field | Length (Byte) | Description |
| --- | --- | --- |
| Cluster ID 213 | 2 | Indicates a set of commands for functions (features) which can be supported by the device |
| Command ID 215 | 1 | Determines a method of using attributes of the device and the smart module ex) status request, function processing request/ack/event. etc |
| Attributes 217 | Variable | Indicates a unit function (feature) supported by the device ex) power on/off |

The cluster ID field 213 has a length of two bytes and corresponds to a set of commands for functions (features) which can be supported by the device.

Table 3 shows the type of cluster ID presented in the cluster ID field 213 and a description of the cluster as an example.

TABLE 3

| Cluster | Cluster ID | Description |
| --- | --- | --- |
| Info Cluster | 0xFC01 (Common) | Device information ex) manufacturer, device type, device model, etc. |
| Function Cluster | 0xFE01 | Request for operating device feature and device control |

In Table 3, although only the information cluster (i.e. info cluster) and the function cluster are described, there may be various clusters such as a power consumption cluster presenting instant power consumption of the device. Further, the info cluster and the function cluster are functions (features) which the device should necessarily provide but the power consumption cluster is a function (feature) which the device can selectively provide.

The clusters are a set of commands for functions (features) of the device and are divided according to a value of the cluster ID 213.

For example, the info cluster may have a value of 0xFC01 as the cluster ID value and present information on a manufacturer or a device type through the value. The function cluster may have a value of 0xFE01 as the cluster ID value and present a request for operating the function of the device and a device control through the value.

The command ID field 215 present in Table 2 has a length of one byte and a method of using the attribute field 217 may be determined through the command ID field 215. The command ID field 215 may indicate a device level/status/function processing request message of the device and a response message thereof together with the cluster ID 213. That is, the command ID 215 is used together with the cluster ID 213 to define functions of the messages transmitted/received between the device and the smart module.

FIG. 4 shows command values corresponding to the command ID field 215 and descriptions of the command values as an example.

TABLE 4

| Command | Command ID 215 | Description |
| --- | --- | --- |
| Read all | 0x00 | Request for statuses of all mandatory attributes<br>ex) request for device level |
| Read all response | 0x01 | Response to a Read all command |
| Read | 0x02 | Request for statuses of attributes of the device |
| Read response | 0x03 | Response to a Read command |
| Write | 0x04 | Request for processing attributes of the device |
| Write response | 0x05 | Response to a Write command |
| Event Notification | 0x06 | Command for informing of a status change when an event is generated in the device |
| Event Notification Response | 0x07 | Response to an Event Notification command |

For example, the command ID may have a value of 0x00 and the value corresponds to the Read all command. The Read all command refers to a request for statuses of all mandatory attributes. For example, the Read all command is used together with the info cluster ID to make a request for the device level corresponding to detailed information on the device by the smart module and may be used for a device level request message transmitted when the smart module desires to identify the device level.

An ID of the Read all response command may have a value of 0x01 and the read all response command refers to a response to the Read all command. For example, when the smart module makes a request for the device level, the Read all response command may be used for a device level response message including information on the device level transmitted to the smart module from the device.

An ID of the Read command may have a value of 0x02 and the Read command refers to a request for statuses of attributes of the device by the smart module. For example, the attributes may refer to functions of devices. Accordingly, the Read command may be used for a status request message transmitted when the smart module desires to identify the status of the device.

An ID of the Read response command may have a value of 0x03. For example, the Read response command may be used for a status response message including information on a device status transmitted to the smart module by the device in response to the request for statuses of functions of the device.

An ID of the write command may have a value of 0x04. For example, the Write command may be used as a command for making a request for instructing the device to process the function by the smart module. Accordingly, the Write command may be used for a device function processing request message transmitted when the smart module makes a request for device function processing.

An ID of the Write response command may have a value of 0x05. For example, the Write response command may be used for a function processing response message including information on a result of the device function processing transmitted to the smart module by the device in response to the function processing request message.

An ID of the Event Notification command may have a value of 0x06. For example, the Event Notification command may be used as a command for informing the smart module of a device status change by the device when an event is generated. Accordingly, the Event Notification command may be used for an event notification message for informing the smart module of a status change when an event is generated.

For example, when the device is a refrigerator, the generation of the event corresponding to an increase in temperature within the refrigerator since power supply and demand of the refrigerator is not smooth due to an external factor. That is, the event may refer to a device status change which can be generated by the external factor. Further, the Event Notification command may be selectively provided only to a device which can receive the Event Notification command according to a device type.

An ID of the Event Notification Response command may have a value of 0x07 and the Event Notification Response command is transmitted to the device by the smart module and may be used for a response message to the event notification message.

Similar to the Event Notification command, the Event Notification Response command may be selectively provided only to a device which can receive the Event Notification Response command according to a device type.

The attribute field 217 presented in Table 2 has a variable size. The attribute may indicate a function which can be supported by the device through the cluster ID 213.

The attribute field 217 may include an attribute ID field 219, an attribute length field 221, and an attribute value field 223, and the fields are described through Table 5 below.

Table 5 describes fields included in the attribute field 217.

TABLE 5

| Field | Length | Description |
| --- | --- | --- |
| Attr ID 219 | 1 | ID for distinguishing attributes |
| Attr Length 221 | 1 | Length information of attribute field |
| Attr value 223 | Variable | Value indicating an attribute |

The attribute ID field 219 indicates information on functions which can be supported by the device through the cluster ID 213. The attribute ID 219 has a size of one byte.

The attribute length field 221 indicates size information of the attribute field 217 and has a size of one byte.

The attribute value field 223 indicates information presented by the attribute ID field 219 and has a variable size.

For example, when the cluster ID field 213 indicates the info cluster, the attribute ID field 219 and the attribute value field 223 included in the attribute field 217 may be shown as Table 6.

TABLE 6

| Attr 217 | Attr-ID 219 | Attr Value 223 |
| --- | --- | --- |
| Manufacturer name | 0x11 | Ex) SAMSUNG (0x00) |
| Protocol version | 0x12 | Ex) S-CUBE PROTOCOL VERSION (0x01) |

In Table 6, the attribute field 217 is classified according to the type of cluster indicated by the cluster ID and the classified attribute field has the attribute ID 219 corresponding to the device attribute.

For example, when a value indicating the info cluster is presented in the cluster ID field, device information such as a manufacturer name, a device module ID, a device type, a protocol version, a device level, and a module number may be presented in the attribution fields. Each of the presented device attributes may be classified through the attribute ID 219 and information on the attributes may be identified through the attribute value field 223.

Further, each of the fields of the protocol illustrated in FIG. 2 may be implemented according to each function based on the device type. For example, two cases where the device is a device of a first device level which can provide an additional function for improving service quality in addition to the mandatory function through enough memory resources and the device is a device of a second device level which can provide only the mandatory function in operation control due to a lack of memory resources and interruption impossibility will be compared with reference to Table 7.

Table 7 defines functions which can be provided according to device levels of products with respect to each of the cluster ID field 213, the command ID field 215, and the attribute field 217 included in the payload field 207.

TABLE 7

| | Field | First device level | Second device level |
|---|---|---|---|
| Cluster (213), | Info Cluster | mandatory | mandatory |
| | Function Cluster | mandatory | Partially mandatory |
| | Power Cluster | mandatory | selective |
| | Energy Cluster | mandatory | selective |
| Attribute (217) | Multi Attr | mandatory | — |
| | Single Attr | — | mandatory |
| Command (215) | Read All/Read All Response | mandatory | mandatory |
| | Read/Read Response | mandatory | mandatory |
| | Write/Write Response | mandatory | mandatory |
| | Event Notification/ Event Notification Response | mandatory | selective |

The cluster ID field 213 presents an info cluster according to the device level, a function fluster according to a device operation, a power cluster, and an energy cluster indicating power consumption of the device. The device of the first device level may provide all the presented clusters but the device of the second device level may partially provide functions which can be operated by the device. Further, the power cluster and the energy cluster indicating power consumption may be selectively provided according to the device type.

The attribute field 215 presents a multi-attribute and a single attribute. The multi-attribute indicates that the device can simultaneously perform various functions and means that the payload field requires attribute fields corresponding to respective functions in this case.

The single attribute indicates that the device can execute only one command at one time and means that the payload field includes only an attribute field corresponding to one function. That is, referring to Table 7, while the device of the first device level may receive multi-status, device level, and function processing request message, the device of the second device level may receive only a single-status, device level, and function processing request message.

The command ID field 215 is a means for making a request for or providing information defined in the cluster ID field. The device of the first device level may use all of the Read All/Response command, the Read/Response command, the Write/Response command, and the Event Notification/Response command, but the device of the second device level may selectively use the Event Notification/ Event Notification Response command according to the device level.

That is, the smart module selects a message according to the device level and determines a field value corresponding to the message in a process of transmitting/receiving a message using the protocol structure. Further, functions which cannot be implemented due to the lack of memory resources of the device are performed by the smart module, so there is an effect of reducing the memory capacities of the device.

The protocol field defined as an embodiment of the present disclosure through FIG. 2 and Tables 1 to 7 is described. Hereinafter, in a process of transmitting/receiving data between the smart module and the device, a device level/status/function processing request message and a response message thereof will be described through the protocol field with reference to FIG. 3.

FIG. 3 illustrates a process of transmitting/receiving a message between a smart module and a device according to an embodiment of the present disclosure.

Referring to FIG. 3, the smart module 300 may transmit a device level request message making a request for a device level of the device 310, a status request message making a request for a status of the device 310, and a function processing request message making a request for processing a function of the device 310 to the device 310 in step 301.

The device 310 may transmit a device level response message, a status response message, and a function processing response message including information on the device level information, status information, and function processing information of the device 310 in response to the device level request message, the status request message, and the function processing request message, respectively in step 303.

Further, the status request message, the function processing request message, the status response message corresponding to the response to the status request message, and the function processing response message corresponding to the response to the function processing request message may be classified into a multi-status/response and single request/ response message according to whether the device 310 has the first device level in which multiple functions can be simultaneously processed and the device 310 has the second device level in which only one function can be processed at one time.

In addition, 200 ms shown in FIG. 3 means that the device 310 should transmit a response within the time (200 ms) when the smart module 300 transmits a status request message or a function processing request message to the device 310. That is, when the smart module 300 does not receive a response message from the device 310 within the time, the smart module 300 may repeatedly transmit the status request message or the function processing request message.

200 ms is a predetermined time for assisting in conveniently describing the present disclosure and may be changed according to by the user or a configuration scheme of the smart module 300.

Further, when the smart module 300 does not receive the response message from the device within the time, the smart module 300 may recognize that the status of the device 310 has a problem and directly transmit information indicating that the status of the device 310 has the problem to a home server or an adjacent user. When transmitting the device level, status, and function processing response messages, the device 310 may inform the smart module 310, through the attribute value field of the payload field, whether the device level, status, and function processing request messages are received. That is, the device 310 may transmit ACK or NACK to the smart module 300. For example, when the device 310 normally receives the device level, status, and function processing request message, the device 310 informs the smart module 300 of the normal reception by returning the device level, status, and function processing response messages (including a request value).

In contrast, when the device 310 does not normally receive the device level, status, and function processing request messages, the device 310 informs the smart module 300 of the reception error by returning the device level, status, and function processing response messages including a value indicating that the normal performance is not possible, for example, a value of "0x0E".

Hereinafter, the device level, status, and function processing request messages and the device level, status, and function processing response messages corresponding to response messages thereof transmitted/received according to the device level, which are applied to the protocol field will be described.

It is assumed that a value shown in each field is referred to from Tables 3 and 4 and FIG. 3.

Table 8 shows the structure of the device level request message using the Read all command transmitted to the device 310 by the smart module 300.

TABLE 8

[device level request]

| STx | Reserve | Packet Length | Payload | C/S | ETx |
|---|---|---|---|---|---|
| 0xD0 | 0x00 00 | 0x05 | 3 Bytes | 0xXX | 0xE0 |

| Cluster ID | Command ID |
|---|---|
| 0xFC01 | 0x00 |

In an initial connection between the device 310 and the smart module 300, the smart module 300 transmits a device level request message having a format of [device level request] of Table 8 to the device 310.

In response to the device level request message, the device 310 transmits a device level response message using the Read all response command to the smart module 300.

Table 9 shows a structure of the device level response message when the device 310 transmits the device level response message to the smart module 300.

TABLE 9

[device level response]

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len | Val | ... | Attr | Attr len | Val |
|---|---|---|---|---|---|---|---|---|
| 0xFC01 | 0x01 | 0x01 | | | ... | 0xXX | | |

A [device level response] message corresponding to a response to the [device level request] message of Table 8 may be transmitted in a format shown in Table 9. That is, a payload field of the [device level response] message includes information on the device level requested by the smart module 300. A request value corresponding to the information is written in a plurality of attribute fields generated in the payload field.

When the [device level request] message makes a request for only one device level, the device 310 inserts only information corresponding to one attribute into the [device level response] message and transmits the [device level response] message to the smart module 300.

The smart module 300 having received the device level response message may determine the device level. For example, the smart module 300 may determine whether the device 310 is a device which can process the multi-status request message or the multi-function processing request message with enough memory'resources or a device which can process only the single status request message or the single function processing response message due to the lack of memory resources.

FIG. 10 shows a structure of the status request message using the Read command transmitted to the device 310 by the smart module 300.

TABLE 10

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len | ... | Attr | Attr len |
|---|---|---|---|---|---|---|
| 0xXXXM | 0x02 | 0x01 | 0 | ... | 0xXX | 0 |

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len |
|---|---|---|---|
| 0xXXXX | 0x02 | 0x01 | 0 |

When the device can simultaneously process a plurality of pieces of status information requests, the smart module 300 transmits a [multi-status request] message in a [multi-status request] format shown in Table 1:0 to the device 310. Contrastingly, when the device cannot simultaneously process a plurality of pieces of status information requests, the smart'module 300 transmits a [single status request] message in a [single status request] format to the device 310.

The [multi-status request] message is transmitted with all of the plurality of pieces of status request, information through a plurality of attribute fields included in the payload field and the [single status request] message is transmitted with status request information on one, function through an attribute field included in the payload field.

For example, when the device 310 which can support only the single status request receives a request for a plurality of pieces of status information from the smart module 300, the device 310 may transmit the number of [single status response messages] corresponding to the number of pieces of status information requested by the smart module 300 to the smart module 300.

Further, the smart module 300 may input null values into the attribute fields of the [multi-status request message] and the [single status request message] to transmit the messages to the device 310, so that special request information may not be inserted into the messages.

In response to the message, the device 310 transmits a status response message using the Read response command to the smart module 300.

Table 11 shows a structure of the status response message using the Read response command.

TABLE 11

[multi-status response]

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len | Val | ... | Attr | Attr len | Val |
|---|---|---|---|---|---|---|---|---|
| 0xXXXX | 0x03 | 0x01 | | 0x0F | ... | 0xXX | | 0x01 |

[single status response]

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len |
|---|---|---|---|
| 0xXXXX | 0x03 | 0x01 | 0 |

The status response message corresponding to a response to the [multi-status request] message of Table 10 may be transmitted in the same format as that of the [multi-status response] message shown in Table 11. That is, a payload field of the [multi-status response] message includes status information requested by the smart module 300. A request value corresponding to the information is written in a plurality of attribute fields generated in the payload field.

When the smart module 300 makes a request for only one status to the device 310 by using the [single status request] message, the device 310 inserts information corresponding to one attribute into the [single status response] message and transmits the [single status response] message to the smart module 300. A request value corresponding to the information is written in one attribute field generated in the payload field.

For example, the device 310 which can respond only to the single status request receives a plurality of [single status request] messages from the smart module 300, the device 310 transmits the number of [single status response] message corresponding to the number of pieces of status information requested by the smart module 300 in response to the [single status request] messages. A payload field of the [single status response] message includes only the one of pieces of status information requested by the smart module 300 and a request value corresponding to the information is written in one attribute field generated in the payload field. An order of status information transmitted through the [single status response] message may be determined according to a predetermined priority.

Table 1.2 shows a structure of the function processing request message using the write command.

TABLE 12

[multi-function processing request]

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len | Val | ... | Attr | Attr len | Val |
|---|---|---|---|---|---|---|---|---|
| 0xXXXX | 0x04 | 0x01 | | 0x0F | ... | 0xXX | | 0x01 |

[single function processing request]

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len |
|---|---|---|---|
| 0xXXXX | 0x04 | 0x01 | 0 |

When the device 310 can simultaneously process multiple functions, the smart module 300 may transmit a [multi-function processing request] message in a format as shown in Table 12 to the device 310.

In contrast, when the device 310 cannot simultaneously process multiple functions or the smart module 300 instructs the device 310 to process a single function, the smart module 300 may insert only information corresponding, to the single function processing request into the [single function processing request] message and transmit the [single function processing request]. The [multi-function processing request] message is transmitted with all of a plurality of pieces of function processing request information through a plurality of attribute fields included in its own payload field.

In contrast, the [single function processing request] message is transmitted with one function processing request information through one attribute field included in its own payload field.

For example, when the device 310 which can support only the single function processing receives a request for multiple function processing from the smart module 300, the device 310 may transmit the number of [single function processing request] messages corresponding to the number of pieces of function processing information requested by the smart module 300 to the smart module 300.

Further, the smart module 300 may input null values into the attribute fields of the [multi-function processing request] message and the [single function processing request] message to transmit the messages to the device 310, so that special request information may not be inserted into the messages.

In response to the message, the device transmits the function processing response message to the smart module.

Table 13 shows a structure of the function processing response message transmitted to the smart module by the device.

TABLE 13

[multi-function processing response]

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len | Val | ... | Attr | Attr len | Val |
|---|---|---|---|---|---|---|---|---|
| 0xXXXX | 0x05 | 0x01 | | 0x0F | ... | 0xXX | | 0x01 |

[single function processing response]

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len |
|---|---|---|---|
| 0xXXXX | 0x05 | 0x01 | 0 |

A [multi-function processing response] message corresponding to a response to the [multi-function processing request] message of Table 12 may be transmitted in a format shown in Table 13. That is, a payload field of the [multi-function processing response] message includes information on the function processing requested by the smart module 300. A request value corresponding to the information is written in a plurality of attribute fields generated in the payload field.

When the device 310 cannot simultaneously perform multiple function processing or the device receives the [single function processing request] message asking for the processing of only one function, the device 310 inserts only one function processing information into the [single function processing response] message and transmits the [single function processing response] message to the smart module 300. A request value corresponding to the information is written in one attribute field generated in the payload field.

Table 14 shows a structure of the event notification message using the Event Notification command.

TABLE 14

[event notification]

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len | Val | ... | Attr | Attr len | Val |
|---|---|---|---|---|---|---|---|---|
| 0xXXXX | 0x06 | 0x03 | | 0xF0 | ... | 0xXX | | 0x0F |

When a plurality of events are generated in the device 310, the device 310 transmits an event notification message in an [event notification] format shown in Table 14 to the smart module 300. The [event notification] message is transmitted with information on a plurality of events through attribute fields included in the payload field.

In response to the [event notification] message, the smart module transmits an [event notification response] message using the Event Notification Response command to the device.

Table 15 shows a structure of the event notification response message transmitted to the device by the smart module.

TABLE 15

[event notification response]

| STx | Reserve | Packet Length | Payload | C/S | ETx |
|---|---|---|---|---|---|
| 0xD0 | 0x00 00 | 0xXX | Variable | 0xXX | 0xE0 |

| Cluster | Cmd | Attr | Attr len | Val | ... | Attr | Attr len | Val |
|---|---|---|---|---|---|---|---|---|
| 0xXXXX | 0x07 | 0x03 | | 0xF0 | ... | 0xXX | | 0x0F |

The [event notification response] message corresponding to a response to the [event notification] message of Table 14 may be transmitted in a format shown in Table 15. That is, ACK information on a plurality of events included in the [event notification] message is inserted into the [event notification response] message and transmitted.

Hereinafter, FIGS. 4 to 5 illustrate a process of transmitting/receiving a status request message and a status response message according to a device level according to an embodiment of the present disclosure.

A device illustrated in FIG. 4 has the device level in which only a mandatory function is provided due to the lack of memory resources and transmits/receives a status request message and a status response message according to a predetermined period.

In contrast, when an event is generated in the device illustrated in FIG. 5, the device may inform the smart module of whether the event is generated or not.

FIG. 4 illustrates a process of transmitting a device level request message and a status request message and transmitting a device level response message and a status response message in response to the request messages according to an event processing process between the device and the smart module according to a first embodiment of the present disclosure.

Referring to FIG. 4, a home network system includes a smart module 400, a device 410, and a host system (not shown).

When the smart module 400 is connected to the device 410 through a socket connector mounted to the device 410, the device 410 supplies power to the smart module 400 in step 401. The smart module 400 having received the power transmits a device level request message to the device 410 in step 403. In response to the device level request message, the device 410 transmits a device level response message including its own device level information to the smart module 400 in step 405. At this time, information on the device level of the device 410 is written in the attribute value field of the payload field included in the protocol field.

The smart module 400 identifies the device level of the device 410 through the device level response message in step 407. It is assumed herein that the device level of the device 410 corresponds to a device level in which only functions mandatory for operations are provided due to the lack of memory resources.

When a particular event is generated in the device 410, the device 410 does not support the event notification function, that a function of providing a notification to the host system. Accordingly, the smart module 400 transmits the status request message to the device 410 on a predetermined period (between 1 to 5 seconds or according to a characteristic of the device) in steps 409, 413, and 419 and receives the status response message corresponding to a response to the request from the device 410 in steps 411, 415, and 421. The status response message includes information indicating whether a status of the function of the device 410 has changed and the information indicating whether the status of the device 410 has changed is written in the attribute value field of the payload field included in the protocol field.

Meanwhile, when a command indicating the particular event is input by the user in step 414, the device 410 transmits the status response message including information indicating that the status has changed to the smart module 400 in step 415. The information indicating that the status of the device 410 has changed is also written in the attribute value field of the payload filed included in the protocol field.

For example, when the device is an air conditioner, the particular event may be controlling an airflow direction, controlling the temperature, setting an operation time or the like. Although it has been described as an example that the particular event is input by the user, the particular event may be generated according to a change in a status of the device such as opening of a refrigerator door, stopping of a washing machine, notification of breakdown of the device and the like regardless of a user input.

Further, the smart module 400 transmits/receives the status request message and the status response message until the smart module 400 receives the status response message including the information indicating that the status of the device 410 has changed.

Thereafter, when the smart module 400 receives the status response message including the information indicating that the status of the device 410 has changed from the device 410 in step 415, the smart module 400 detects the change in the status of the device 410 and transmits a message informing of the generation of the corresponding event to the host system in step 417.

FIG. 5 illustrates a process in which the smart module transmits the device level request message and the status request message and receives the device level response message and the status response message as responses to the request messages according to the event processing process between the device and the smart module according to a second embodiment of the present disclosure.

Referring to FIG. 5, a home network system includes a smart module 500, a device 510, and a host system (not shown). When the smart module 500 is connected to the device 510 through a socket connector mounted to the device 510, the device 510 supplies power to the smart module 500 in step 501. The smart module 500 having received the power transmits a device level request message to the device 510 in step 503. In response to the device level request message, the device 510 transmits a device level response message including its own device level information to the smart module 500 in step 505. At this time, information on the device level of the device 510 is written in the attribute value field of the payload field included in the protocol field.

The smart module 500 identifies the device level of the device 510 through the device level response message in step 507. It is assumed that the device level of the device 510 is a device level which can provide functions mandatory for the operation and also additional functions for improving service quality through enough memory resources.

When an event notification function, that is, a particular event is generated in the device 510, the device 510 supports a function of notifying the generation of the event to the host system, so that the smart module 500 waits for receiving a message informing the generation of the event without transmitting a separate status request message.

That is, when a command indicating the particular event is input by the user in step 509, the device 510 transmits an event notification message informing of the generation of the event to the smart module 500 in step 511 and the smart module 500 transmits the corresponding event to the host system in step 513.

FIG. 6 is a flowchart illustrating operations of the smart module according to the first embodiment and the second embodiment of the present disclosure.

Referring to FIG. 6, the smart module receives power from the device in step 601. The smart module transmits a device level request message to the device in step 603. The smart module receives a device level response message corresponding to a response message to the device level request message from the device in step 605. The device level is included in the attribute field of the payload field of the device level response message. Thereafter, the smart module identifies the received device level response message to identify the device level in step 607.

That is, the smart module identifies whether the device level is a device level which can provide only mandatory functions due to the lack of memory resources. As a result of the identification, when the device can provide only the mandatory functions, the smart module transmits a status request message to the device in step 609. The status request message is transmitted every a predetermined period between 1 and 5 seconds. Alternatively, the status request message is transmitted every a period which is determined by a characteristic of the device. Then, the smart module receives a status response message from the device as a response message to the request message in step 611. Information indicating whether a status of the device has changed is included in the attribute value of the payload field in the status response message. Steps 609 to 613 are repeated before the generation of the event in the device. Thereafter, when the smart module identifies the generation of the event through the identification of whether the status of the device has changed in step 613, that is, when the status response message includes the information indicating that the status of the device has changed, the smart module transmits a message including the event information to the host system in step 617.

In contrast, when the smart module identifies that the periodical request is not required in step 607, the device does not have the device level which provides only mandatory functions due to the lack of memory resources. Thereafter, the smart module identifies whether the event notification message is received in step 615. As a result of the identification, when the event notification message is received, the smart module transmits the event notification message to the host system in step 617. When the smart module does not receive the event notification message in step 615, the smart module stands by until the smart module receives the event notification message without performing any special operation.

FIG. 7 is a flowchart illustrating operations of the device according to the first embodiment and the second embodiment of the present disclosure.

Referring to FIG. 7, the device receives a device level request message from the smart module in step 701. In response to the message, the device transmits a device level response message to the smart module in step 703. Information on the device level is written in the attribute value field of the payload field in the device level response message. That is, the attribute value includes information indicating whether the smart module transmits a status request message periodically or not or information indicating whether the device provides only mandatory functions due to the lack of memory resources. The smart module identifies whether the device provides only the mandatory functions due to the lack of memory resources, that is, the smart module is required to periodically transmit the status request message in step 705 and the device identifies whether the status request message is received from the smart module in step 707. Thereafter, when the device receives the status request message, the device identifies whether an event command is input in step 709. When the event is generated in the device, the device transmits a status response message indicating that the status of the device has changed to the smart module in step 711.

For example, when the device is an air conditioner, the event may be controlling an airflow direction, controlling the temperature, setting an operation time or the like. Further, the event may be generated according to a change in the status of the device such as opening of a refrigerator door, termination of a washing machine, a notification of breakdown of the device or the like regardless of a user input.

However, when the generation of the event in the device cannot be identified in step 709, the device transmits the status response message indicating that the status of the device has not been changed to the smart module in step 713.

When the periodic status request message is not required in step 705, that is, when the device does not have the device level which provides only the mandatory functions due to the lack of memory resources, the device identifies whether an event command is detected in step 715. As a result of the identification, when the event command is detected, the device transmits an event notification message to the smart module in step 717. Alternatively, the device may directly transmit the event notification message to the home system.

Hereinafter, a data transmitting/receiving process between the smart module and the device according to function processing requested by the home system will be described as an embodiment of the present disclosure with reference to FIGS. 8 to 11. It should be noted that the embodiment described below is not exclusive from the embodiment described through FIGS. 4 to 7. That is, the smart module and the device may be implemented to perform the operations described in the embodiment of FIGS. 4 to 7 and also operations to be described in the embodiment of FIGS. 8 to 11. However, the device level which is the basis of the determination of whether the mandatory functions are supported to distinguish between embodiments of FIGS. 4 and 5 may be different from the device level on which the basis of the determination of whether the mandatory functions are supported to distinguish between embodiments of FIGS. 8 and 9. For example, while whether the mandatory functions are supported can be determined according to whether an interruption function is supported in the embodiments of FIGS. 4 and 5, it cannot be in the embodiments of FIGS. 8 and 9.

In FIG. 8, the smart module having received a multi-operation request from the host system transmits a single function processing request message to the device having insufficient memory resources.

In contrast, in FIG. 9, the smart module having received a multi-operation request from the host system transmits a multi-function processing request message to the device.

FIG. 8 illustrates a process in which the smart module transmits a multi-operation request received from the host system to the device according to a third embodiment of the present disclosure.

Referring to FIG. 8, a home network system includes a smart module 800, a device 810, and a host system 820. For example, it is assumed that the device 810 is an air conditioner and the host system 820 transmits a multi-function processing request message making a request for selecting rotation of the air conditioner or stopping the rotation of the air conditioner, controlling the airflow strength, controlling the temperature, and changing a timer setting value in step 801. The smart module 800 having received the multi-function processing request message identifies the device level of the device 810. The device level information of the device 810 may be obtained through the device level request message and the device level response message as described above. It is assumed herein that the device level of the device 810 corresponds to a device level in which only functions mandatory for the operation are provided due to the lack of memory resources. That is, when the device 810 cannot simultaneously perform multiple function processing, the smart module 800 transmits first to Nth function processing request messages with response to respective services according to N services included in the multi-function request message and receives first to Nth function processing response message corresponding to responses to the function processing request messages from the device. That is, the smart module 800 transmits the first function processing request message instructing the device 810 to rotate the air conditioner or stop the rotation of the air conditioner in step 803 and the device 810 executes an operation indicated by the first function processing request message and then transmits the first function processing response message to the smart module 800 in step 804. The smart module 800 transmits the second function processing request message instructing the device 810 to control the airflow strength in step 805 and the device 810 executes an operation indicated by the second function processing request message and then transmits the second function processing response message to the smart module 800 in step 806. The smart module 800 transmits the third function processing request message instructing the device 810 to control the temperature of the air conditioner in step 807 and the device 810 executes an operation indicated by the third function processing request message and then transmits the third function processing response message to the smart module 800 in step 808. The smart module 800 transmits the fourth function processing request message instructing the device 810 to change the timer setting value in step 809 and the device 810 executes an operation indicated by the fourth function processing request message and then transmits the fourth function processing response message to the smart module 800 in step 811.

Thereafter, the smart module 800 transmits a message indicating that the device 810 has executed all the operations instructed by the host system 820 to the host system 820 in step 813.

FIG. 9 illustrates a process in which the smart module transmits a multi-operation request message received from the host system to the device according to a fourth embodiment of the present disclosure.

Referring to FIG. 9, a home network system includes a smart module 900, a device 910, and a host system 920.

It is assumed that the device 910 is an air conditioner and the host system 920 transmits a multi-function processing request message making a request for rotating the air conditioner or stopping the rotation of the air conditioner, controlling the airflow strength, controlling the temperature, and changing a timer setting value to the smart module 900 in step 901. The smart module 900 having received the multi-function processing request message identifies the device level of the device 910. The device level information of the device 910 may be obtained through the device level request message and the device level response message as described above. It is assumed that the device level of the device 910 is a device level which can provide additional functions for improving service quality as well as the functions mandatory for the operation through enough memory resources.

The smart module 800 receives the multi-function processing request message in step 901 and transmits the multi-function processing request message to the device 910 in step 903. The device 910 executes the operations instructed by the multi-function processing request message, that is, operations for rotating the air conditioner or stopping the rotation of the air conditioner, controlling the airflow strength, controlling the temperature, or changing a timer setting value and then transmits a multi-function processing response message to the smart module 900 in step 905. Thereafter, the smart module 900 transmits a multi-operation completion message indicating that the device 910 has executed all the operations instructed by the host system 920 to the host system 920 in step 907.

FIG. 10 is a flowchart illustrating operations of the smart module according to the third embodiment and the fourth embodiment of the present disclosure.

Referring to FIG. 10, the smart module receives a multi-function processing request message from the host system in step 1001. The multi-function processing request message includes information indicating an operation of a function of the device connected to the smart module and may simultaneously make a request for a plurality of functions. Thereafter, the smart module identifies whether the connected device can perform multiple function processing, that is, identifies whether the device level is a device level which can provide only mandatory functions due to the lack of memory resources in step 1003. As a result of the identification, when the device level is the device level which provides only the mandatory functions due to the lack of memory resources, the smart module transmits a first function processing request message to the device according to N services requested by the host system in step 1005. The smart module receives a first function processing response message from the device in step 1007. As described above, the smart module sequentially transmits N function processing request messages to the device in step 1009 and receives Nth function processing response messages from the device in step 1011.

For example, when it is assumed that the device is an air conditioner, functions which can be executed by the air conditioner may include rotating the air conditioner or stopping the rotation of the air conditioner, controlling the airflow strength, controlling the temperature, and changing a timer setting value. That is, the smart module receives a message making a request for processing a plurality of functions to the air conditioner from the host system. Accordingly, the smart module transmits information making a request for operating the functions requested by the host system to the air conditioner. That is, the smart module transmits a function processing request message with respect to the rotation of the air conditioner to the air conditioner and then receives a function processing response message with respect to the selecting of the rotation of the air conditioner from the air conditioner in response to the request. The smart module sequentially makes a request for the functions requested by the host system to the air conditioner and receives an operation completion response message corresponding to the request In contrast, the smart module identifies that the connected device can perform multiple function processing in step 1003. When the device can perform the multiple function processing, the smart module transmits a multi-function processing request message to the device in step 1013. Thereafter, the smart module receives a multi-function processing response message as a response to the multi-function processing request message from the device in step 1015.

For example, when it is assumed that the device is an air conditioner, functions which can be executed by the air conditioner may include rotating the air conditioner or stopping the rotation of the air conditioner, controlling the airflow strength, controlling the temperature, and changing a timer setting value. That is, when the smart module receives a request for instructing the air conditioner to process a plurality of functions from the host system, the plurality of functions include information on making a request for executing the functions of rotating the air conditioner or stopping the rotation of the air conditioner, controlling the airflow strength, controlling the temperature, and changing a timer setting value. Accordingly, the smart module simultaneously transmits pieces of information making a request for instructing the air conditioner to execute the functions by the host system to the air conditioner. Thereafter, the smart module receives a multi-function processing response message indicating the completion of the operations of rotating the air conditioner or stopping the rotation of the air conditioner, controlling the airflow strength, controlling the temperature, and changing the timer setting value.

FIG. 11 is a flowchart illustrating operations of the device according to the third embodiment and the fourth embodiment of the present disclosure.

Referring to FIG. 11, when the device cannot perform multiple function processing, that is, when the device has a device level which provides only mandatory functions due to the lack of memory resources in step 1101, the device receives a first function processing request message from the smart module according to N services requested by the smart module in step 1103. Thereafter, the device transmits a first function processing response message as a response to the first function processing request message to the smart module in step 1105. That is, the device receives N function processing request messages from the smart module in step 1107 and transmits N function processing response messages as responses to the N function processing request messages in step 1109.

For example, when it is assumed that the device is an air conditioner and functions which can be executed by the air conditioner include rotating the air conditioner or stopping the rotation of the air conditioner, controlling the airflow strength, controlling the temperature, and setting a timer value. Further, it is assumed that the multi-function processing request message received from the smart module includes information on making a request for processing the functions of rotating the air conditioner or stopping the rotation of the air conditioner, controlling the airflow strength, controlling the temperature, and setting the timer value. Accordingly, the air conditioner individually receives the requested functions from the smart module and transmits function processing response messages with respect to the multiple function processing to the smart module.

In contrast, when the device can perform multiple function processing in step 1101, the device receives a multi-function processing request message from the smart module in step 1111. Thereafter, the device transmits a multi-function processing response message as a response to the received multi-function processing request message to the smart module in step 1113. For example, when it is assumed that the device is an air conditioner and functions which can be executed by the air conditioner include rotating the air conditioner or stopping the rotation of the air conditioner, controlling the airflow strength, controlling the temperature, and setting a timer value. Further, the multi-function processing request message received from the smart module includes information on making a request for processing the functions of rotating the air conditioner or stopping the rotation of the air conditioner, controlling the airflow strength, controlling the temperature, and setting the timer value. Accordingly, the air conditioner simultaneously receives the information making the request for the functions from the smart module and transmits a multi-function processing response message corresponding to the information to the smart module.

FIG. 12 is a block diagram illustrating a configuration of the smart module according to the present disclosure.

The smart module according to the present disclosure may include a transmitter 1203 and a receiver 1205 for transmitting/receiving a message to/from the device, and a controller 1201 for controlling the transmitter 1203 and the receiver 1205.

The controller 1201 may be understood to perform all operations of the smart module described in the present disclosure. For example, the controller 1201 may be understood to perform a message generation operation of the smart module.

Meanwhile, although the transmitter 1203 and the receiver 1205 are illustrated as separated components in FIG. 12, the transmitter 1203 and the receiver 1205 may be implemented as one component. Further, the transmitter 1203, the receiver 1205, and the controller 1201 may be implemented as one component.

FIG. 13 is a block diagram illustrating a configuration of the device according to the present disclosure.

The device according to the present disclosure may include a transmitter 1303 and a receiver 1305 for transmitting/receiving a message to/from the device, and a controller 1301 for controlling the transmitter 1303 and the receiver 1305.

The controller 1301 may be understood to perform all operations of the device described in the present disclosure. For example, the controller 1301 may be understood to perform a message generation operation and a status determination operation of the device.

Meanwhile, although the transmitter 1303 and the receiver 1305 are illustrated as separated components in FIG. 13, the transmitter 1303 and the receiver 1305 may be implemented as one component. Further, the transmitter 1303, the receiver 1305, and the controller 1301 may be implemented as one component.

The above-described operations may be implemented by including a memory device storing the corresponding program code in a smart module or a predetermined configuration unit within a device. That is, the controller of the smart module or device may perform the above described operations by reading and executing the program code stored in the memory device by means of a processor or a central processing unit (CPU).

The various components of the smart module, device and the like used in the specification may operate by using a hardware circuit, for example, a combination of a complementary metal oxide semiconductor based logical circuit, firmware, software and/or hardware, and a combination of firmware and/or software inserted into a machine-readable medium. As an example, various electric configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method of performing communication by a smart module in a home network system which includes a home server, a device and the smart module, the method comprising:
    obtaining, by the smart module, device level information of the device;
    identifying, by the smart module, whether the device level information indicates that the device provides a mandatory function;
    transmitting, by the smart module, when the device level information indicates that the device provides mandatory function, a status request message making a request for status information of the device to the device;
    receiving, by the smart module, a status response message including information indicating whether a status of the device has changed;
    transmitting, by the smart module, when the information indicates that the status of the device has changed, an event generation message to the home server;
    receiving, by the smart module, a multi-operation request message from the home server, wherein the multi-operation request message is configured to be a message to perform multiple services;
    generating, by the smart module, a plurality of single-operation request messages based on the multi-operation request message; and
    transmitting, by the smart module, the plurality of single-operation request messages to the device.

2. The method of claim 1, further comprising:
    identifying, when the device level information does not indicate that the device provides the mandatory function, whether an event notification message indicating that a particular event has been input, from the device; and
    transmitting, when the event notification message is received, an event generation message to the home server.

3. The method of claim 1, wherein the obtaining of the device level information of the device comprises:
    transmitting a device level request message to the device; and
    receiving a device level response message including the device level information.

4. The method of claim 1, wherein the device level information and the information indicating that the status of the device has changed are written in an attribute field of a payload field included in a protocol field and a length of the attribute field is variable.

5. The method of claim 4, wherein the attribute field includes an attribute identifier field indicating a unit function supported by the device, an attribute length field indicating a length of the attribute field, and an attribute value field indicating an inherent value of a function operated by the device.

6. The method of claim 1, further comprising:
identifying, when a multi-operation request message making a request for multiple services is received from the home server, whether the device level information indicates that the device provides the mandatory function;
transmitting, when the device level information of the device indicates that the device provides the mandatory function, first to Nth function processing request messages with respect to the multiple services to the device;
receiving first to Nth function processing response messages indicating that the device has executed the corresponding services with respect to the first to Nth function processing request messages; and
transmitting a multi-operation completion message indicating that the multiple services all have been executed to the home server.

7. The method of claim 6, further comprising:
transmitting, when the device level information of the device does not indicate that the device provides the mandatory function, the multi-function processing request message to the device;
receiving a multi-function processing response message indicating that the device has completed the execution of the multiple services from the device; and
transmitting the multi-operation completion message to the home server.

8. A method of performing communication by a device in a home network system which includes a home server, the device and a smart module, the method comprising:
transmitting, by the device, when a device level request message is received from a smart module, a device level response message including device level information of the device to the smart module device;
identifying, by the device, when the device level information of the device indicates that the device provides a mandatory function, whether an event is generated when a status request message is received from the smart module devices;
transmitting, by the device, when the event is generated, a status response message including information indicating that a status of the device has changed to the smart module; and
receiving, from the smart module, a plurality of single-operation request messages generated based on a multi-operation request message which is received by the smart module from the home server.

9. The method of claim 8, further comprising:
identifying, when the device level information does not indicate that the device provides the mandatory function, whether the event is generated; and
transmitting, when the event is generated, an event notification message to the smart module.

10. The method of claim 8, wherein the device level information and the information indicating that the status of the device has changed are written in an attribute field of a payload field included in a protocol field and a length of the attribute field is variable.

11. The method of claim 10, wherein the attribute field includes an attribute identifier field indicating a unit function supported by the device, an attribute length field indicating a length of the attribute field, and an attribute value field indicating an inherent value of a function operated by the device.

12. The method of claim 8, wherein the event is generated by a command input by a user or a change in the status of the device.

13. The method of claim 8, further comprising:
receiving, when the device level information indicates that the device provides the mandatory function, first to Nth function processing request messages with respect to multiple services; and
transmitting first to Nth function processing response messages indicating that the device has executed the corresponding services with respect to the first to Nth function processing request messages.

14. The method of claim 13, further comprising:
receiving, when the device level information does not indicate that the device provides the mandatory function, a multi-function processing request message making a request for multiple services; and
transmitting a multi-function processing response message indicating the device has executed the multiple services.

15. A smart module communicating in a home network system which includes a home server, a device and the smart module, the smart module comprising:
a receiver configured to:
receive a device level response message including device level information of the device, and
receive a status response message including information indicating whether a status of the device has changed;
at least one processor configured to:
identify whether the device level information indicates that the device provides mandatory function, and
identify whether the status of the device has changed from the status response message; and
a transmitter configured to:
transmit a status request message to the device when the device level information indicates that the device provides the mandatory function, and
transmit an event generation message informing of generation of an event to the home server when the status response message indicates that the status of the device has changed,
wherein the receiver is further configured to receive a multi-operation request message from the home server, wherein the multi-operation request message is configured to be a message to perform multiple services,
wherein the at least one processor is further configured to generate a plurality of single-operation request messages based on the multi-operation request message, and
wherein the transmitter is further configured to transmit the plurality of single-operation to the device.

16. The smart module of claim 15,
wherein the at least one processor is further configured to identify whether an event notification message indicating that a particular event has been input is received from the device when the device level information of the device does not indicate that the device provides the mandatory function, and wherein the transmitter is further configured to transmit the event generation message informing of the generation of the event to the home server when the event notification message is received.

17. The smart module of claim 15,
wherein the transmitter is further configured to transmit a device level request message to the device, and
wherein the receiver is further configured to receive a device level response message including the device level information.

18. The smart module of claim 15, wherein the device level information and the information indicating that the status of the device has changed are written in an attribute field of a payload field included in a protocol field and a length of the attribute field is variable.

19. The smart module of claim 18, wherein the attribute field includes an attribute identifier field indicating a unit function supported by the device, an attribute length field indicating a length of the attribute field, and an attribute value field indicating an inherent value of a function operated by the device.

20. The smart module of claim 15,
wherein the at least one processor is further configured to identify whether the device level information indicates that the device provides the mandatory function when a multi-operation request message making a request for multiple services is received from the home server,
wherein the transmitter is further configured to:
transmit first to Nth function processing request messages with respect to the multiple services to the device, and
transmit a multi-operation completion message indicating that the multiple services all have been executed to the home server when the device level information indicates that the device provides the mandatory function, and
wherein the receiver is further configured to receive first to Nth function processing response messages indicating that the device has executed the corresponding services with respect to the first to Nth function processing request messages.

21. The smart module of claim 20,
wherein the transmitter is further configured to transmit the multi-function processing request message to the device and the multi-operation completion message to the home server when the device level information does not indicate that the device provides the mandatory function, and
wherein the receiver is further configured to receive a multi-function processing response message indicating that the device has executed the multiple services from the device.

22. A device for communication in a home network system which includes a home server, the device and a smart module, the device comprising:

a receiver configured to receive a device level request message and a status request message from a smart module;
a transmitter configured to:
transmit, to the smart module, a device level response message including device level information of the device, and
transmit, to the smart module, a status response message including information indicating that a status of the device has changed; and
at least one processor configured to identify, when the device level information indicates that the device provides mandatory function, whether an event is generated when the status request message is received,
wherein the receiver is configured to receive, from the smart module, a plurality of single-operation request messages generated based on a multi-operation request message which is received by the smart module from the home server.

23. The device of claim 22,
wherein the at least one processor is further configured to identify whether the event is generated when the device level information does not indicate that the device provides the mandatory function, and
wherein the transmitter is further configured to transmit an event notification message informing of the generation of the event to the smart module when the event is generated.

24. The device of claim 22, wherein the device level information and the information indicating that the status of the device has changed are written in an attribute field of a payload field included in a protocol field and a length of the attribute field is variable.

25. The device of claim 24, wherein the attribute field includes an attribute identifier field indicating a unit function supported by the device, an attribute length field indicating a length of the attribute field, and an attribute value field indicating an inherent value of a function operated by the device.

26. The device of claim 22 wherein the event is generated by a command input by a user or a change in the status of the device.

27. The device of claim 22,
wherein the at least one processor is further configured to identify whether the device level information indicates that the device provides the mandatory function,
wherein the receiver is further configured to receive first to Nth function processing request messages with respect to the multiple services when the device level information indicates that the device provides the mandatory function, and
wherein the transmitter is further configured to transmit first to Nth function processing response messages indicating that the device has executed the corresponding services with respect to the first to Nth function processing request messages.

28. The device of claim 27,
wherein the receiver is further configured to receive a multi-function processing request message making a request for multiple services when the device level information does not indicate that the device provides the mandatory function, and
wherein the transmitter is further configured to transmit a multi-function processing response message indicating that the device has executed the multiple services.

* * * * *